US007195163B2

(12) United States Patent
Yoo

(10) Patent No.: US 7,195,163 B2
(45) Date of Patent: Mar. 27, 2007

(54) LASER SCANNING UNIT

(75) Inventor: Jae-hwan Yoo, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/236,918

(22) Filed: Sep. 9, 2002

(65) Prior Publication Data

US 2003/0071125 A1 Apr. 17, 2003

(30) Foreign Application Priority Data

Oct. 16, 2001 (KR) .............................. 2001-63694

(51) Int. Cl.
*G06K 7/10* (2006.01)

(52) U.S. Cl. ....................... 235/454; 235/447; 235/440

(58) Field of Classification Search ........... 235/462.36, 235/440, 447, 454; 355/30–41, 67; 358/527, 358/302, 2.1

See application file for complete search history.

(56) References Cited

U.S. PATENT DOCUMENTS 3,601,485 A * 8/1971 Barbieri ....................... 355/38
4,172,664 A * 10/1979 Charsky et al. ............. 356/508
4,527,886 A * 7/1985 Inamori et al. ................ 399/4
4,548,476 A * 10/1985 Kaneko ....................... 345/97
4,859,034 A * 8/1989 Shiraishi et al. ............... 349/3
4,941,719 A * 7/1990 Hisada et al. ............... 359/205
5,294,944 A * 3/1994 Takeyama et al. .......... 347/232
5,450,211 A * 9/1995 Kanai et al. ................ 358/401
5,561,743 A * 10/1996 Kanai et al. ................. 358/1.7
5,570,224 A * 10/1996 Endo et al. ................. 359/212
5,627,670 A * 5/1997 Minoura et al. ............ 359/212
5,804,805 A * 9/1998 Koenck et al. ........ 235/462.01
5,841,121 A * 11/1998 Koenck ................. 235/472.01
5,864,390 A * 1/1999 Johnson et al. ............... 355/67
5,914,480 A * 6/1999 Swartz .................. 235/472.01
6,208,369 B1 * 3/2001 Oren et al. ................. 347/244
6,529,261 B2 * 3/2003 Shinada ....................... 355/41
6,568,598 B1 * 5/2003 Bobba et al. .......... 235/462.39
6,657,770 B2 * 12/2003 Marom et al. .............. 359/290
6,775,042 B2 * 8/2004 Ishihara ...................... 359/212

FOREIGN PATENT DOCUMENTS

JP 61-243480 10/1986

(Continued)

OTHER PUBLICATIONS

Japanese Office Action Issued Oct. 18, 2005.

*Primary Examiner*—Kimberly D. Nguyen
(74) *Attorney, Agent, or Firm*—Staas & Halsey LLP

(57) ABSTRACT

A laser scanning unit to form an electrostatic latent image according to an image signal by projecting a light onto a photosensitive medium. The laser scanning unit has a light source having a cylindrical shape of a predetermined length; a reflective member surrounding the light source to focus the light from the light source; a micro-mirror array to reflect the light focused by the reflective member toward the photosensitive medium; a driving control unit to drive the micro-mirror array according to the image signal; and a micro-lens array disposed in an optical path between the micro-mirror array and the photosensitive medium, to focus the light reflected from the micro-mirror array onto the surface of the photosensitive medium.

29 Claims, 4 Drawing Sheets

FOREIGN PATENT DOCUMENTS

| | | |
|---|---|---|
| JP | 62-108220 | 5/1987 |
| JP | 9-164723 | 6/1997 |
| JP | 10-161045 | 6/1998 |
| JP | 2000-141745 | 5/2000 |
| JP | 2001-91877 | 4/2001 |
| JP | 2001-228555 | 8/2001 |

* cited by examiner

LASER SCANNING UNIT

CROSS-REFERENCE TO RELATED APPLICATIONS

This application claims the benefit of Korean Application No. 2001-63694, filed Oct. 16, 2001, in the Korean Industrial Property Office, the disclosure of which is incorporated herein by reference.

BACKGROUND OF THE INVENTION

1. Field of the Invention

The present invention relates to a laser scanning unit, and more particularly, to a laser scanning unit to improve speed and compactness of a laser printer.

2. Description of the Related Art

Generally, a laser printer reproduces an image by focusing a laser beam from a laser diode onto a photosensitive drum 20 (see FIG. 1) with respect to an image signal, and transferring an electrostatic latent image from the photosensitive drum 20 to a printing medium such as paper. Such a laser printer has a scanning unit to generate and focus the laser beam onto the photosensitive drum 20.

FIG. 1 is a schematic view showing the structure of a conventional laser scanning unit. Referring to FIG. 1, the conventional laser scanning unit includes a laser diode 10, serving as a light source, by releasing a laser beam, and a collimator lens 11 to make the laser beam from the laser diode 10 parallel with respect to a light axis of the laser beam. The conventional laser scanning unit further includes a cylinder lens 12 to make the parallel laser beam from the collimator lens 11 a linear beam horizontal with respect to a sub-projection direction B, a polygon mirror 13 to move the horizontal linear laser beam at a uniform linear velocity for scanning, and a polygon mirror-driving motor 14 to rotate the polygon mirror 13 at a constant velocity. The conventional laser scanning unit further includes an f-θ lens 15 having a constant refractivity with respect to the light axis, to focus the light beam on a scanning surface by polarizing the light reflected from the polygon mirror 13 in a main-scanning direction A and then by a difference compensation, a reflecting mirror 16 to form a latent image on the surface of the photosensitive drum 20 by reflecting the laser beam from the f-θ lens 15. The conventional laser scanning unit also includes a horizontal synchronization mirror 17 to reflect the laser beam from the f-θ lens 15, in a horizontal direction, and a photo sensor 18 to receive and synchronize the laser beam reflected from the horizontal synchronization mirror 17.

In the conventional laser scanning unit described above, the laser diode 10 irradiates a laser beam corresponding to the image signal of an image, and the laser beam is converted into a parallel ray by the collimator lens 11. The parallel ray is focused on the surface of the polygon mirror 13 on the sub-projection surface by the cylinder lens 12. The light characteristics of the main-projection surface are maintained uniform. Here, the 'main-projection surface' is the plane that is in a vertical relation with respect to the rotational axis X of the polygon mirror 13, while the 'sub-projection surface' is the plane that is in a vertical relation with respect to the main-projection surface. The light reflected from the polygon mirror 13 is formed into a latent image corresponding to the desired image, as the light is passed through the f-θ lens 15, formed into a predetermined shape on the main and sub-projection surfaces, and focused on the photosensitive drum 20.

The process of forming an image of a line on the main-projection surface will now be described. The laser beam passes through the collimator lens 11 and the cylinder lens 12, and reaches the polygon mirror 13. The laser beam reflected from the polygon mirror 13 is then incident on the f-θ lens 15. Then the laser beam is made incident on the photosensitive drum 20 at a predetermined angle varying according to a facial angle of the polygon mirror 13. That is, the polygon mirror 13 connected with the polygon driving motor 14 is rotated at a predetermined velocity, varying the angle of the incident laser beam to make the laser beam incident on the photosensitive drum 20. As a result, the laser beam is formed on the main-projection surface on the photosensitive drum 20 in the form of a line. The image in the sub-projection direction B is formed as the photosensitive drum 20 is rotated to arrange the line image in the main-projection direction A at predetermined uniform intervals. At this time, to obtain the line images of acceptable quality, the starting points of the respective line images can be aligned constantly by detecting the laser beam reflected from the horizontal synchronization mirror 17 with the photo sensor 18 and then synchronizing the laser beam.

However, the conventional laser scanning unit constructed as above has the following problems. First, in order to obtain a quality image, the structure of the f-θ lens 15 is complicated, making the unit less compact. Furthermore, since the rotational velocity of the polygon mirror-driving motor 14 must be increased in order to perform the printing process at a rapid speed, the manufacturing cost increases.

SUMMARY OF THE INVENTION

Accordingly, it is an object of the present invention to overcome the above-mentioned problems of the related art.

It is another object of the present invention to provide a laser scanning unit having a simple structure and which is capable of printing at a high velocity and with high printing quality.

Additional objects and advantages of the invention will be set forth in part in the description which follows and, in part, will be obvious from the description, or may be learned by practice of the invention.

The foregoing and other objects of the present invention are achieved by providing a laser scanning unit to form an electrostatic latent image corresponding to an image signal by projecting a light onto a photosensitive medium, the laser scanning unit including a light source having a cylindrical shape to project the light; a reflective member surrounding the light source to focus the light from the light source; a micro-mirror array to reflect the light focused by the reflective member toward the photosensitive medium; a driving control unit to drive the micro-mirror array according to the image signal; and a micro-lens array disposed in an optical path of the light between the micro-mirror array and the photosensitive medium, to focus the light reflected from the micro-mirror array onto the surface of the photosensitive medium.

According to an aspect of the present invention, the laser scanning unit includes a blocking member disposed on an outer side of the photosensitive medium, to block a light approaching the photosensitive medium without passing through the micro-lens array.

Furthermore, the light source may have a length greater than or equal to a print width of an image formed on the photosensitive medium.

Furthermore, the light source may be a fluorescent lamp or a halogen lamp.

According to another aspect of the present invention, the micro-mirror array includes a number of micro-mirrors corresponding to a desired resolution.

Also, the micro-lens array may include a number of micro-lenses corresponding to a desired resolution.

According to another aspect of the present invention, the driving control unit drives the micro-mirror array all at once, or on the basis of a predetermined block unit.

Furthermore, the micro-mirror array and the micro-lens array may be formed in at least two rows to print a plurality of printing rows simultaneously.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
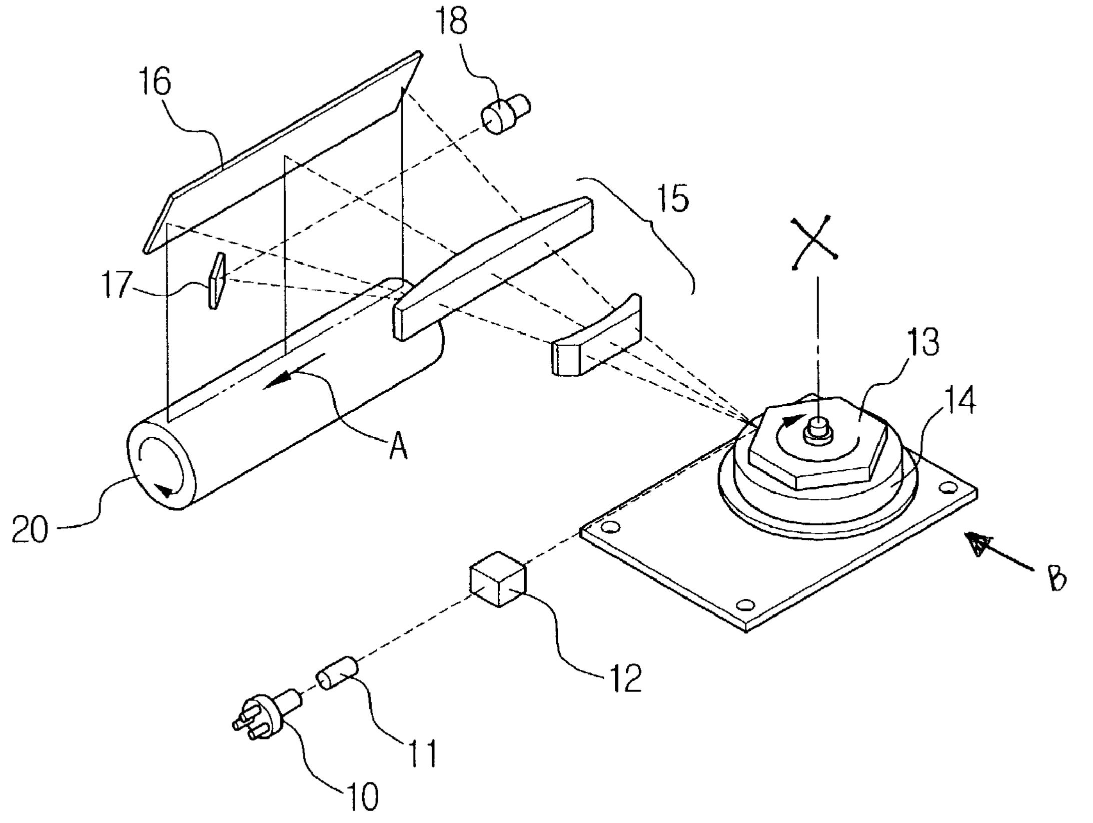
FIG.1 (PRIOR ART)
FIG. 1 is a schematic perspective view of a conventional laser scanning unit.

Reference will now be made in detail to the present preferred embodiments of the present invention, examples of which are illustrated in the accompanying drawings, wherein like reference numerals refer to like elements throughout.

Figure 2:
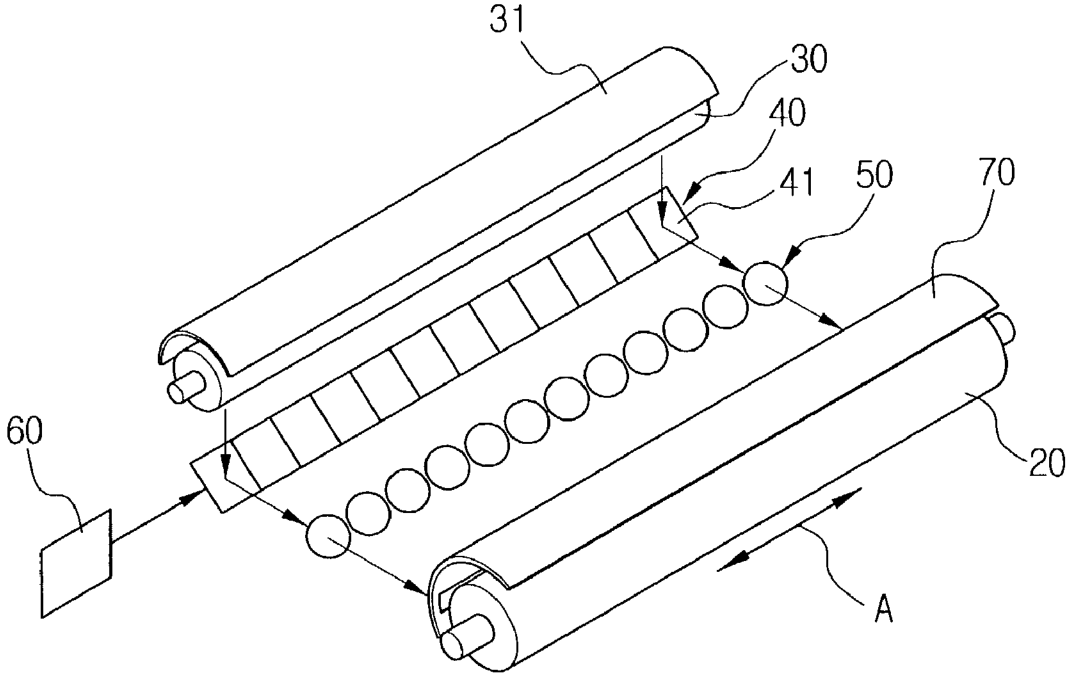
FIG. 2 is a schematic perspective view of a laser scanning unit according to an embodiment of the present invention.

Referring to FIG. 2, the laser scanning unit according to an embodiment of the present invention includes a light source 30 to generate light, a reflective member 31 to collect the light generated from the light source 30 in a predetermined direction, and a micro-mirror array 40 to reflect the light collected by the reflective member 31 toward the photosensitive medium, i.e., toward the photosensitive drum 20. The present laser scanning unit also includes a driving control unit 60 to drive the micro-mirror array 40, and a micro-lens array 50 to focus the light reflected from the micro-mirror array 40 on the photosensitive drum 20.

The light source 30 has a predetermined length, and a cylindrical shape, and may be a fluorescent light or a halogen lamp. Furthermore, the light source 30 may have a length greater than a width of the image formed on the photosensitive drum 20. In other words, the light source 30 may be longer than or equal in length to the photosensitive drum 20.

The reflective member 31 is formed to partially cover the light source 30. The reflective member 31 has a semi-cylindrical shape, and is longer than the light source 30. Accordingly, the reflective member 31 can collect the light irradiated from the light source 30 toward the micro-mirror array 40.

The micro-mirror array 40 is arranged in a parallel relation with respect to the light source 30, i.e., parallel to the light emitting direction A. The micro-mirror array 40 reflects the light collected by the reflective member 31 toward the photosensitive drum 20. The micro-mirror array 40 may include a number of micro-mirrors 41, the number corresponding to the resolution of the printer. For example, to print 600 dots per inch on A4-size paper, 4,960 (=210/25.4×600) of the micro-mirrors 41 are employed to form one micro-mirror array 40. The micro-mirrors 41 can be driven by the driving control unit 60 independently, in several block units, or all at once.

Figure 3:
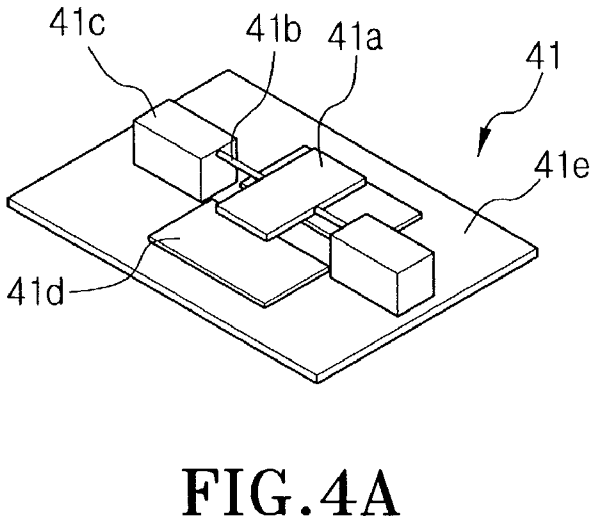
FIG. 3 is a view showing a micro-mirror unit of the micro-mirror array of FIG. 2.

FIG. 3 is a perspective view showing one of the micro-mirrors 41 that form the micro-mirror array 40.

Referring to FIG. 3, the micro-mirror 41 includes a micro-mirror unit 41*a* to reflect the light beam, a hinge unit 41*b* to rotatably support the micro-mirror unit 41*a* so that the micro-mirror unit 41*a* can be rotated by a predetermined angle, a supporting unit 41*c* connected with the hinge unit 41*b* to support the micro-mirror unit 41*a,* and an electrode unit 41*d* to generate a standard voltage with respect to the image signals. The micro-mirror unit 41*a,* the hinge unit 41*b,* the supporting unit 41*c,* and the electrode unit 41*d* are integrated in a silicon substrate 41*e.*

According to the image signals input to the driving control unit 60, the micro-mirrors 41 are set to an on-state. Accordingly, a potential difference is generated between the micro-mirror unit 41*a* and the electrode unit 41*d,* causing the micro-mirror unit 41*a* to rotate on the hinge unit 41*b* by a predetermined angle. Such an operation continues for a predetermined light exposure time, and after the exposure time, the signal is turned into an off-state and accordingly, the micro-mirror unit 41*a* is returned to the parallel position.

The micro mirror array 40 is disposed in an optical path defined between the micro-mirror array 40 and the photosensitive drum 20, and collects the light beam reflected from the micro-lens array 40 onto the surface of the photosensitive drum 20. Just as the micro-mirror array 40, the micro-lens array 50 may include micro-lenses in a number that is appropriate for the desired resolution.

The laser scanning unit of FIG. 2 further includes a blocking member 70 to block external lights, which have not passed through the micro-lens array 40. The blocking member 70 is disposed between the photosensitive drum 20 and the micro-lens array 50, and surrounds the exterior of the photosensitive drum 20.

The operation of the laser scanning unit according to the embodiment of the present invention shown in FIG. 2 will now be described.

Figure 4A:
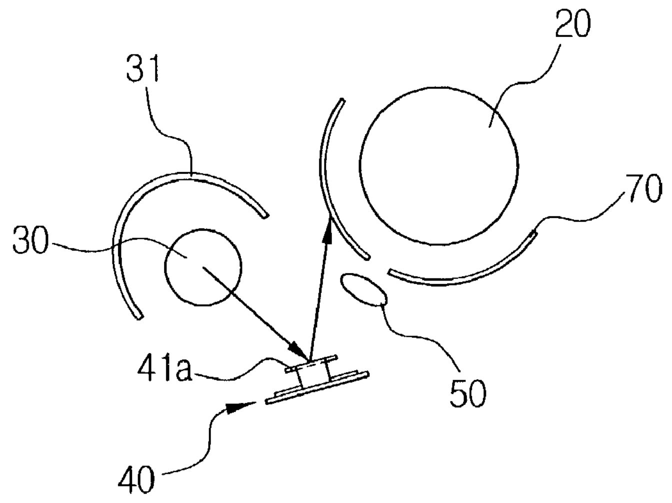
FIG. 4A is a view of the micro-mirror unit of FIG. 3 in an off state.

First, referring to FIG. 4A, the light source 30 generates light with energy from a power supply (not shown). The light from the light source 30 is directly, or indirectly reflected by the reflective member 31, and is incident on the micro-mirror array 40. The micro-mirror array 40 reflects the incident rays toward the photosensitive drum 20. The reflected light is focused on the surface of the photosensitive drum 20 by the micro-lens array 50.

Figure 4B:
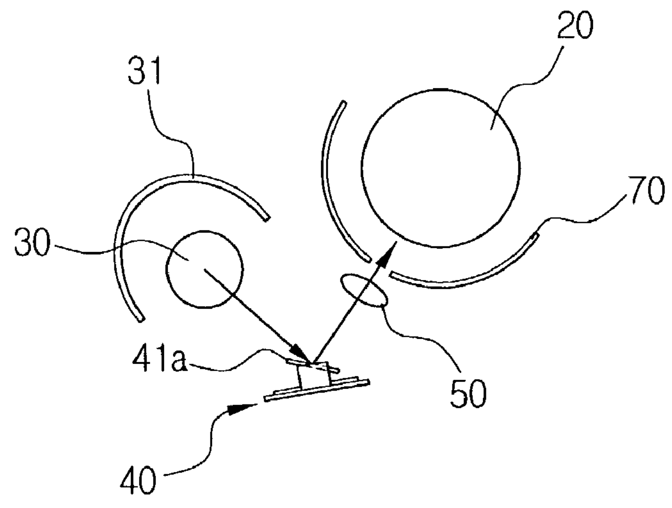
FIG. 4B is a view of the micro-mirror unit of FIG. 3 in an on state.

The process of forming a latent image of one line on the photosensitive drum 20 in a main projection direction will now be described. First, as the light source 30 irradiates light according to the image signals, the micro-mirrors 41 inside the micro-mirror array 40 each maintain an on/off state based on the control signals from the driving control unit 60, according to the image signals of the pixels constituting the one line. In the 'off-state' as shown in FIG. 4A, the micro-mirror unit 41*a* inside the micro-mirror 41 maintains the parallel position, and thus, the light from the light source 30 is not incident on the micro-lens array 40 and the photosensitive drum 20. In this case, the light reflected from the micro-mirror array 40 is blocked by the blocking member 70, and thus, the light is not incident on the photosensitive drum 20. In the 'on-state' as shown in FIG. 4B, the micro-mirror unit 41*a* inside the micro mirror 41 maintains the rotated state, and accordingly, the light from the light source 30 is reflected from the micro-mirror unit 41*a,* and passes through the micro-lens array 50 and is then focused on the surface of the photosensitive drum 20.

Figure 5A:
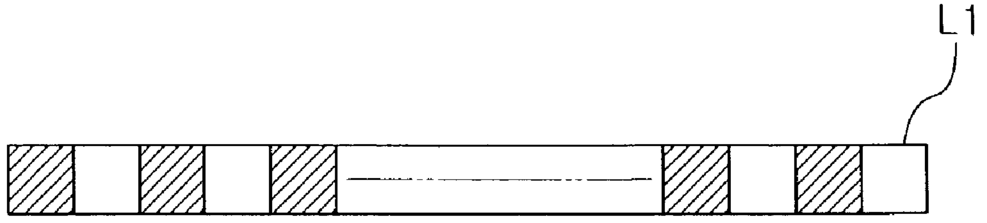
FIG. 5A is a view of a latent image of one line according to the present invention.
Figure 5B:
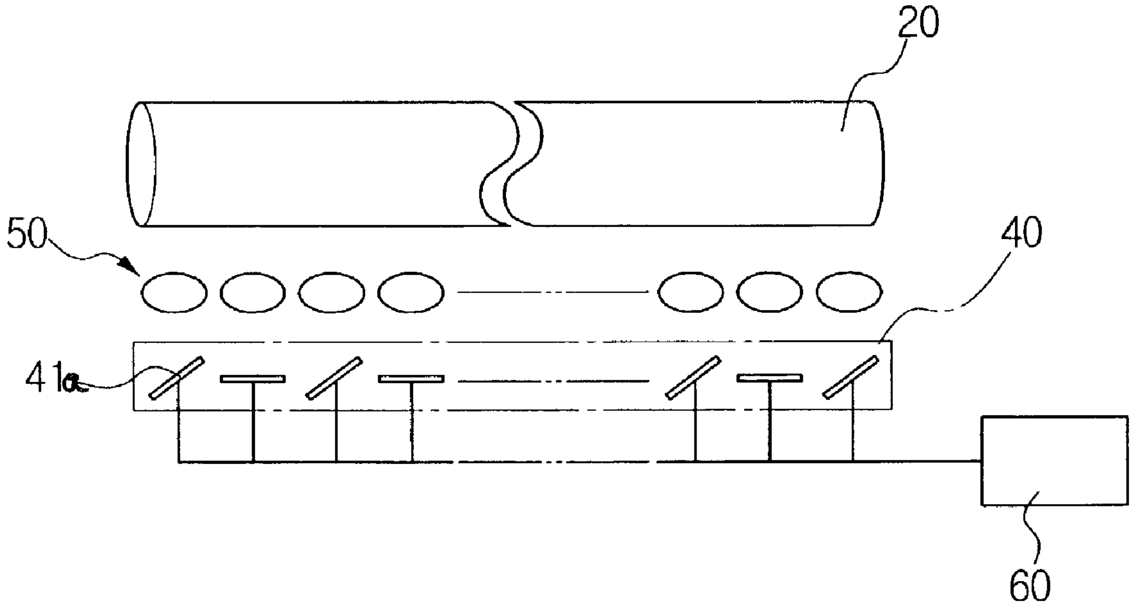
FIG. 5B is a view showing the operation of the laser scanning unit forming a latent image of one line of FIG. 5A.

The micro-mirror units 41*a* inside the micro-mirror array 40 may maintain the on or the off state simultaneously, or in a predetermined number of block units by the image signals of the one line. Accordingly, the latent image is formed on the photosensitive drum 20 with respect to the image signal, simultaneously, or on the basis of the block units. In the case of forming the latent image on the basis of the block units, the latent images for all the blocks are formed within a predetermined line printing time. For example, to print a latent image L1 of one line as shown in FIG. 5A, the driving control unit 60 alternately drives on and off the respective micro-mirror units 41*a,* as shown in FIG. 5B. Accordingly, the latent image is formed as shown in FIG. 5A, having an exposed area and a non-exposed area. The exposed area is represented by a hatch. The line image is printed as the exposed area, and the non-exposed area is not printed.

Figure 6A:
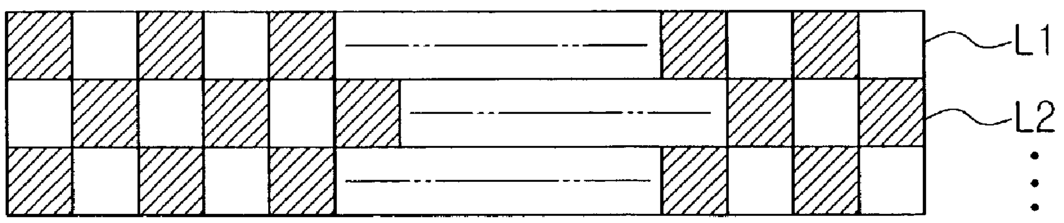
FIG. 6A is a view showing a checker board shape of a latent image formed on the photosensitive drum according to the present invention.
Figure 6B:
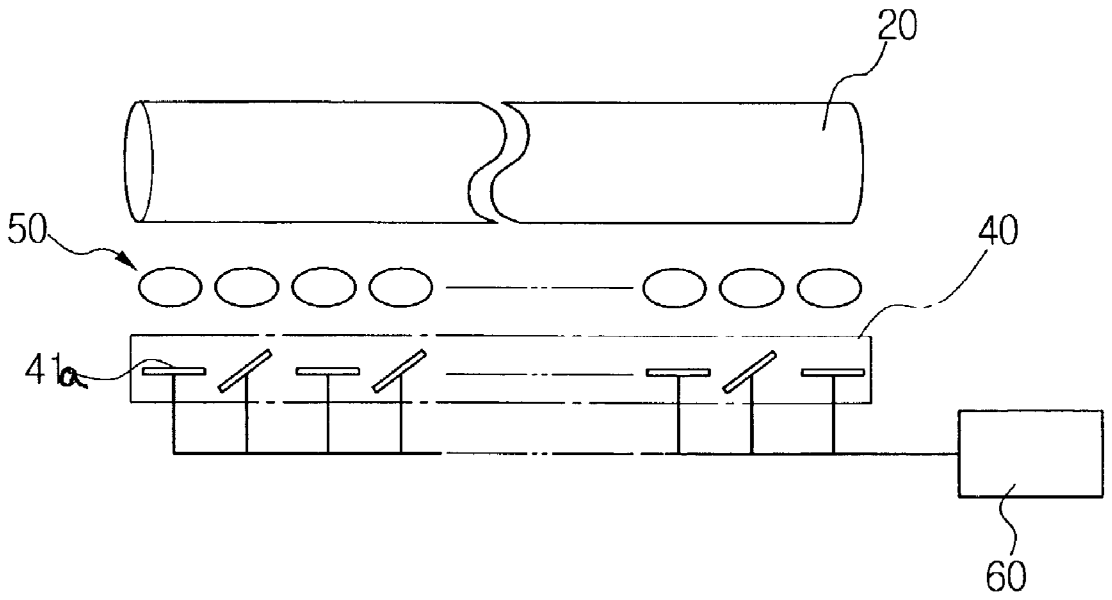
FIG. 6B is a view showing the operation of the laser scanning unit forming a latent image of the second line of FIG. 6A.

Next, the process of forming a latent image in a sub-projection direction, i.e., in a crossing direction of the image, will be described. As shown in FIG. 5A, when the latent image L1 of one line in the main projection direction is completely formed, the photosensitive drum 20 is rotated at a predetermined velocity. When the photosensitive drum 20 is rotated by the angle which is appropriate for the desired resolution, as in the process of printing the preceding latent image L1, the micro-mirror units 41*a* inside the micro-mirror array 40 maintain on/off status corresponding to the image signals. Here, when it is desired that the latent image is a checkered pattern, as shown in FIG. 6A, the on/off state of the micro-mirror units 41*a* is switched from that shown in FIG. 5B to the opposite state to form the latent image L2 of the second line. That is, the micro-mirror unit 41*a* at the left hand side of FIG. 6B is maintained in the off-state, while the micro-mirror unit 41*a* at the left hand side of FIG. 5B is maintained in the on-state. As the latent images L1 and L2 of the respective lines are repeatedly formed on the photosensitive drum 20 that is rotated at a predetermined velocity, the image in the sub-projection direction is formed. Also, by forming the latent images in the main-projection direction and the sub-projection direction until a predetermined printing operation is completed, the desired image can be obtained.

Meanwhile, the light source 30 according to the present invention can emit a certain frequency corresponding to the sensitivity of the photosensitive drum 20.

As described above, the laser scanning unit according to the present invention is constructed such that the light beam irradiated from the relatively long light source 30 is made incident on the photosensitive drum 20 by the use of the micro-mirror array 40 and the micro-lens array 50. As a result, the laser scanning unit is compact, with relatively simpler construction than conventional designs. Further, since a noise generating source such as a motor can be omitted, a quieter laser scanning unit can be achieved.

Figure 7:
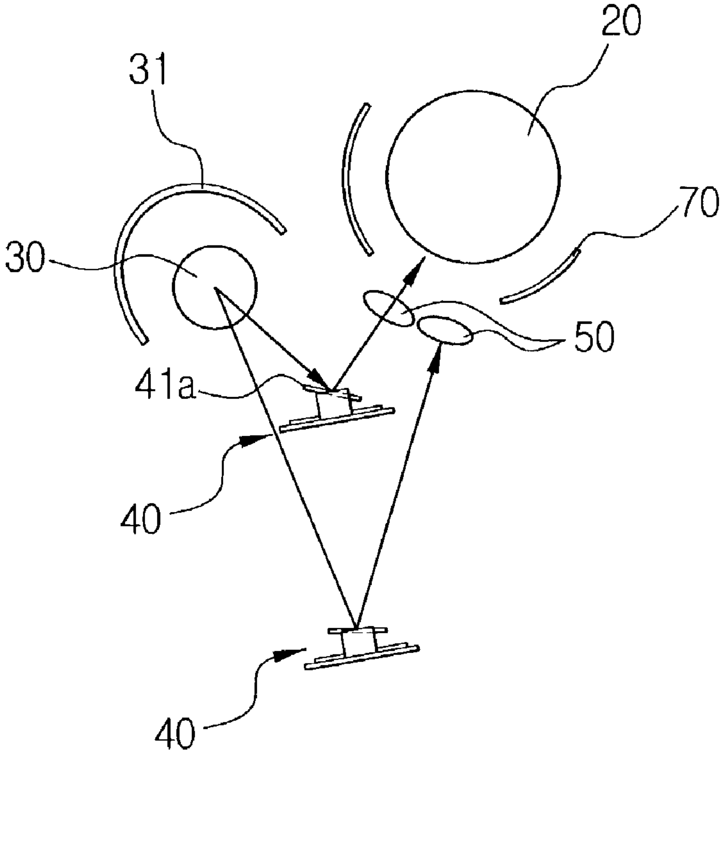
FIG. 7 is a schematic view showing a laser scanning unit according to another embodiment of the present invention.

According to another embodiment of the present invention, the laser scanning unit can have the micro-mirror array 40 and the micro-lens array 50 in multiple lines, as shown in FIG. 7. In this case, the micro-lens array 40 formed in multiple lines reflects the light beam toward the photosensitive drum 20 while being simultaneously, or separately controlled on and off. In this case, the latent images of two lines can be simultaneously formed on the photosensitive drum 20, and as a result, the printing speed increases.

With the laser scanning unit as described above, since the micro-mirror array 40 operates simultaneously or on the basis of block units, to form the latent image of one line, the printing speed for printing one line increases.

Further, according to the present invention, since the driving of the polygon mirror-driving motor is not required to perform the scanning, noise is decreased. Also, excellent image quality is obtained since the error in projection position, which is caused due to the facial angle of the polygon mirror, is prevented.

Also, by employing the micro-lens array that can minimize error during the injection of lenses or movement of the f-θ lens 15, the overall quality of the printing can be improved as compared to the conventional scanner that employs the f-θ lens 15.

Further, according to the present invention, since there is no need for a synchronous detecting unit to align the print starting points of the image during the printing, material costs can be reduced, and a better image quality can be obtained.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A laser scanning unit to form an electrostatic latent image corresponding to an image signal by projecting a light onto a photosensitive medium, the laser scanning unit comprising:

a linear light source to project the light;

a micro-mirror array to reflect the light toward the photosensitive medium;

a micro-lens array disposed in an optical path of the light between the micro-mirror array and the photosensitive medium, to focus the light reflected from the micro-mirror array onto the surface of the photosensitive medium; and a blocking member disposed on an outer side of the photosensitive medium, comprising a blocking portion to block the light approaching the photosensitive medium without passing through the micro-lens array and, a slit in the blocking portion to pass the reflected light incident thereon.

2. The laser scanning unit of claim 1, wherein the light source has a length greater than or equal to a print width of the image.

3. The laser scanning unit of claim 1, wherein the light source is a fluorescent lamp.

4. The laser scanning unit of claim 1, wherein the light source is a halogen lamp.

5. The laser scanning unit of claim 1, wherein the micro-mirror array comprises a plurality of micro-mirrors, and a number of the micro-mirrors corresponds to a desired resolution of the image.

6. The laser scanning unit of claim 1, wherein the micro-lens array comprises a plurality of micro-lenses, and a number of the micro-lenses corresponds to a desired resolution of the image.

7. The laser scanning unit of claim 1, wherein the micro-mirror array and the micro-lens array are formed in at least two rows to print a plurality of printing rows simultaneously.

8. The light scanning unit of claim 1, wherein the light source has a cylindrical shape.

9. The light scanning unit of claim 1, further comprising a reflective member surrounding the light source, the reflective member to focus the light from the light source toward the micro-mirror array.

10. The light scanning unit of claim 1, further comprising a driving control unit to drive the micro-mirror array corresponding to the image signal.

11. The laser scanning unit of claim 10, wherein the driving control unit drives the micro-mirror array all at once, or on the basis of a predetermined block unit.

12. A laser scanning unit to form an electrostatic latent image on a photosensitive medium, the laser scanning unit comprising:

a light source to generate light;

a micro-mirror array comprising a plurality of micro-mirrors to reflect the generated light toward the photosensitive medium, a number of the micro-mirrors corresponding to a desired resolution of the image; a driving control unit to drive the micro-mirror array to thereby generate the image; and a blocking member disposed on an outer side of the photosensitive medium, comprising a blocking portion to block a light approaching the photosensitive medium which is not reflected toward the photosensitive medium by the mirror array, and a slit in the blocking portion to pass the reflected light incident thereon.

13. The laser scanning unit of claim 12, further comprising:

a micro-lens array disposed in an optical path of the light between the micro-mirror array and the photosensitive medium, to focus the light reflected from the micro-mirror array onto the photosensitive medium.

14. The laser scanning unit of claim 13, wherein the micro-mirror array and the micro-lens array are formed in at least two rows to print a plurality of printing rows simultaneously.

15. The laser scanning unit of claim 12, wherein the driving control unit drives the micro-mirror array according to a received image signal.

16. The laser scanning unit of claim 12, wherein each of the micro-mirrors comprises:

a mirror unit to reflect the light;

a hinge unit to rotate the mirror unit; and a support unit to support the hinge unit.

17. The laser scanning unit of claim 16, wherein each of the micro-mirrors further comprises:

an electrode to generate a voltage thereon according to a received image signal, the mirror unit rotating due to a voltage difference between the mirror unit and the electrode.

18. The laser scanning unit of claim 12, wherein the driving control unit drives the micro-mirror array all at once, or on the basis of a predetermined block unit.

19. A laser scanning unit to form an electrostatic latent image on a photosensitive medium, the laser scanning unit comprising:

a light source to generate light;

a plurality of micro-mirror arrays each comprising a plurality of micro-mirrors to reflect the generated light toward the photosensitive medium;

a plurality of driving control units to respectively drive the micro-mirror arrays to thereby generate the image; and a blocking member disposed on an outer side of the photosensitive medium, comprising a blocking portion to block a light approaching the photosensitive medium which is not reflected toward the photosensitive medium by the micro-mirror arrays, and a slit in the blocking portion to pass the reflected light incident thereon.

20. A method of generating an electrostatic latent image on a photosensitive medium, the method comprising:

generating an image signal corresponding to the image;

generating light;

reflecting the generated light with a micro-mirror array comprising a plurality of micro-mirrors focusing selected portions of the reflected light with a focuser;

blocking unfocused portions of the reflected light with a blocker between the focuser and the photosensitive medium that is non-selectively opaque so that the unfocused portions do not pass to the photosensitive medium;

controlling a position of the micro-mirrors according to the image signal; and receiving the reflected light on the photosensitive medium.

21. The method of claim 20, wherein the controlling of a position comprises:

applying voltages to a plurality of electrodes corresponding to the micro-mirrors according to the image signal, the micro-mirrors moving due to a voltage difference between the electrodes and the micro-mirrors.

22. A printer comprising:

a photosensitive medium;

a laser scanning unit to form an electrostatic latent image on the photosensitive medium, the laser scanning unit comprising:

a light source to generate light, a micro-mirror array comprising a plurality of micro-mirrors to reflect the generated light toward the photosensitive medium, a number of the micro-mirrors corresponding to a desired resolution of the image, and a driving control unit to drive the micro-mirror array to thereby generate the image; and a blocking member disposed on an outer side of the photosensitive medium, comprising a blocking portion to block a light approaching the photosensitive medium which is not reflected toward the photosensitive medium by the micro-mirror array, and a slit in the blocking portion to pass the reflected light incident thereon.

23. A laser scanning unit to form an electrostatic latent image on a photosensitive medium, the laser scanning unit comprising:

a light source to generate light, the light source having a length greater than or equal to a width of the image;

a reflector to reflect the generated light toward the photosensitive medium to thereby form the image; and a blocking member disposed on an outer side of the photosensitive medium, comprising a blocking portion to block a light approaching the photosensitive medium which is not reflected toward the photosensitive medium by the reflector, and a slit in the blocking portion to pass the reflected light incident thereon.

24. The laser scanning unit of claim 23, wherein the reflector comprises a micro-mirror array comprising a plurality of micro-mirrors to simultaneously reflect the generated light toward the photosensitive medium.

25. A laser scanning unit to form an electrostatic latent image having first and second rows on a photosensitive medium, the laser scanning unit comprising:

a light source to generate light;

a reflector to reflect the generated light toward the photosensitive medium to thereby form the image, the first and second rows being formed simultaneously; and a blocking member disposed on an outer side of the photosensitive medium, comprising a blocking portion to block a light approaching the photosensitive medium which is not reflected toward the photosensitive medium by the reflector, and a slit in the blocking portion to pass the reflected light incident thereon.

26. The laser scanning unit of claim 25, wherein the reflector comprises first and second micro-mirror arrays, each comprising a plurality of micro-mirrors, respectively arranged in first and second rows to simultaneously reflect the generated light toward the photosensitive medium.

27. A laser scanning unit to form an electrostatic latent image having a plurality of portions in a row on a photosensitive medium, the laser scanning unit comprising:

a light source to generate light;

a reflector to reflect the generated light toward the photosensitive medium to thereby form the image;

a focus unit to focus selected portions of the reflected light; and a blocking unit to block unfocused portions of the reflected light, the portions of the row being formed simultaneously;

a blocking member disposed on an outer side of the photosensitive medium, comprising a blocking portion to block a light approaching the photosensitive medium without passing through the focus unit, and a slit in the blocking portion to pass the focused light incident thereon.

28. The laser scanning unit of claim 27, wherein the reflector comprises a micro-mirror array comprising a plurality of micro-mirrors to simultaneously reflect the generated light toward the photosensitive medium.

29. A method of generating an electrostatic latent image on a photosensitive medium, the method comprising:

generating an image signal corresponding to the image;

generating light;

reflecting the generated light with a micro-mirror array comprising a plurality of micro-mirrors;

focusing selected portions of the reflected light;

blocking unfocused portions of the reflected light with a blocker which is non-selectively opaque;

controlling a position of the micro-mirrors according to the image signal; and receiving the reflected light on the photosensitive medium, wherein the focusing of the selected portions of the reflected light comprises passing the selected portions through a slit in the blocker.

* * * * *

UNITED STATES PATENT AND TRADEMARK OFFICE

CERTIFICATE OF CORRECTION

PATENT NO. : 7,195,163 B2
APPLICATION NO. : 10/236918
DATED : March 27, 2007
INVENTOR(S) : Jae-hwan Yoo It is certified that error appears in the above-identified patent and that said Letters Patent is hereby corrected as shown below:

Column 8, Line 19, after "mirrors" insert --;--.

Signed and Sealed this

Third Day of July, 2007

JON W. DUDAS

*Director of the United States Patent and Trademark Office*